(12) United States Patent
Orizet et al.

(10) Patent No.: US 11,384,315 B2
(45) Date of Patent: Jul. 12, 2022

(54) COPOLYMER COMPRISING UNITS OF TYPE A DERIVING FROM CARBOXYLIC ACID MONOMERS AND UNITS OF TYPE B DERIVING FROM SULFONIC ACID MONOMERS

(71) Applicant: RHODIA OPERATIONS, Paris (FR)

(72) Inventors: Céline Orizet, Bourg la Reine (FR); David James Wilson, Coye la Foret (FR); Julie Clavier, Asnieres sur Seine (FR); Eric Van Gramberen, Bezons (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/112,799

(22) PCT Filed: Jan. 20, 2015

(86) PCT No.: PCT/IB2015/050435
§ 371 (c)(1),
(2) Date: Jul. 20, 2016

(87) PCT Pub. No.: WO2015/110956
PCT Pub. Date: Jul. 30, 2015

(65) Prior Publication Data
US 2016/0340617 A1    Nov. 24, 2016

(30) Foreign Application Priority Data

Jan. 21, 2014 (EP) .................................... 14305084

(51) Int. Cl.
| | |
|---|---|
| *C11D 3/37* | (2006.01) |
| *C08F 293/00* | (2006.01) |
| *C08F 228/02* | (2006.01) |
| *C08F 220/58* | (2006.01) |

(52) U.S. Cl.
CPC .......... *C11D 3/378* (2013.01); *C08F 293/005* (2013.01); *C08F 220/585* (2020.02); *C08F 228/02* (2013.01); *C08F 2438/03* (2013.01)

(58) Field of Classification Search
CPC ......... C11D 3/37; C11D 3/378; C08F 293/00; C08F 228/02
See application file for complete search history.

(56) References Cited

U.S. PATENT DOCUMENTS

| | | |
|---|---|---|
| 2004/0194800 A1 | 7/2004 | Chang et al. |
| 2008/0281053 A1 | 11/2008 | Baum et al. |

FOREIGN PATENT DOCUMENTS

| | | | |
|---|---|---|---|
| DE | 10225794 A1 | 12/2003 | |
| WO | 9931213 A1 | 6/1999 | |
| WO | WO 99/31213 | * 6/1999 | ............... C11D 3/37 |

* cited by examiner

*Primary Examiner* — Brian P Mruk

(74) *Attorney, Agent, or Firm* — Vorys, Sater, Seymour and Pease LLP

(57) ABSTRACT

The present invention relates to a copolymer comprising units of type A deriving from carboxylic acid monomers and units of type B deriving from sulfonic acid monomers, said units of type A and B representing more than 80 mol % of the total moles of units in the copolymer, characterized in that it comprises at least: —one first block formed of at least 95 mol % of units of type A and having a degree of polymerization $DP_1$ comprised between 5 and 150; and —one second block formed of at least 95 mol % of units of type A and B with a molar ratio of units of type A to units of type B greater or equal to 1, wherein said units of type A and units of type B are statistically distributed, said second block having a degree of polymerization $DP_2$ such that $DP_2/DP_1 \geq 1$. It also relates to new detergent compositions comprising such a copolymer, and to the use of this copolymer in a detergent composition, especially an ADW composition, to prevent, limit or eliminate the filming phenomena.

19 Claims, No Drawings

COPOLYMER COMPRISING UNITS OF TYPE A DERIVING FROM CARBOXYLIC ACID MONOMERS AND UNITS OF TYPE B DERIVING FROM SULFONIC ACID MONOMERS

The present invention relates to new copolymers and their use in detergent compositions, especially for Automatic Dishwashing (ADW) to reduce or eliminate the formation of films.

Commercial detergent formulations make it possible to efficiently clean industrial, domestic or communal surfaces. A frequent disadvantage of the detergent formulations is however the formation on the cleaned surfaces of films. This is the case, for example, during the cleaning of dishes, especially the glassware, by hand or using a dishwasher. The films generally correspond to a uniform deposition all over the cleaned surface, especially the film may result from the formation of a mineral precipitate. This phenomenon is known under the term of "filming". Moreover, carbonate and phosphate salts that are conventionally used in detergent compositions, or that may come from the soil, unfortunately contribute to the formation of films.

Various dispersant polymers have been proposed to limit the filming phenomena.

The present invention specifically aims to provide novel agents for detergent compositions that improve the anti-filming effect of the known detergent compositions.

One objective of the present invention is thus to replace all or part of the dispersant polymers currently used in detergent compositions while keeping or even improving the anti-filming effect.

The present invention relates, according to a first one of its aspects, to a copolymer comprising units of type A deriving from carboxylic acid monomers and units of type B deriving from sulfonic acid monomers, said units of type A and B representing more than 80 mol % of the total moles of units in the copolymer, characterized in that it comprises at least:
  one first block formed of at least 95 mol % of units of type A and having a degree of polymerization $DP_1$ comprised between 5 and 150; and
  one second block formed of at least 95 mol % of units of type A and B with a molar ratio of units of type A to units of type B being greater or equal to 1, wherein said units of type A and units of type B are statistically distributed, said second block having a degree of polymerization $DP_2$ such that $DP_2/DP_1 \geq 1$.

In the continuation, the copolymer is denoted by "copolymer of the invention" or more simply "the copolymer".

Within the context of the present invention, the expression "unit deriving from a monomer" denotes a unit which can be obtained directly from said monomer by polymerization. For example, a unit deriving from acrylic acid monomer denotes a unit of formula —$CH_2$—$CH(COOH)$— even if this unit has been obtained by polymerizing an acrylic acid ester, followed by hydrolysing. Thus, the terminology "unit deriving from a monomer" relates only to the final composition of the polymer and is independent of the polymerization process used to synthesize the polymer.

The wording "first block" (also referred to as "block 1") and "second block" (also referred to as "block 2") are used only for the purpose of designating each of the blocks; and in no way imply a linkage order in the copolymer of the invention, neither in the steps of its preparation process.

Said units of type A of the first block may be identical to or different from said units of type A included in the second block.

For a purpose of simplification only, the units of type A in said first block will be referred below as units A', and the units of type A in said second block will be referred below as units A". Thus, units A' and units A" may be identical or different units of type A.

Against all expectations, the inventors have discovered that it is thus possible to attain a detergent composition showing excellent performance in term of reduction of the filming phenomena, by using such a copolymer.

In particular, as will be seen below, a copolymer of the invention exhibits an anti-filming effect better than that provided by the statistical AA/AMPS copolymers, such as the one sold under the trademark Acusol™ 587.

In the rest of the text, the abbreviation "AA" refers to acrylic acid, "AMPS" to 2-acrylamido-2-methylpropane-sulfonate, and "SVS" to sodium vinyl sulfonate.

According to another of its aspects, the present invention relates to a detergent composition comprising at least one copolymer defined previously.

The present invention proves more particularly advantageous with regard to ADW detergent compositions, in particular domestic ADW compositions.

The present invention also relates, according to still another of its aspects, to the use of at least one copolymer as defined above, in a detergent composition, especially a ADW detergent composition, to prevent, limit or eliminate the filming phenomena.

The invention also relates to a process for preventing, limiting or eliminating the filming phenomena due to washing, especially in ADW, comprising the use of a detergent composition containing at least one copolymer as defined above.

Other features, advantages and modes of application of the copolymer and detergent composition according to the invention will emerge more clearly on reading the following description and examples.

In the remainder of the text, the expressions "between . . . and . . . ", "ranging from . . . to . . . " and "varying from . . . to . . . " are equivalent and are understood to mean that the limits are included, unless otherwise mentioned.

Copolymer of the Invention

As specified previously, the copolymer used according to the invention is formed of at least 80 mol % of units deriving from carboxylic acid monomers (referred to as "units of type A" or to units A' and A") and units deriving from sulfonic acid monomers (referred to as "units of type B").

In particular, said units of type A and of type B may represent more than 85 mol % of the total moles of units in the copolymer, more particularly more than 90 mol %, in particular more than 95 mol %.

The optional monomer units other than said units of type A and B may be of various types, for example phosph(on)ate, cationic, amine containing, polyalkylene oxide, zwitterionic, amido or alcohol, alkyl ester units.

According to a particular embodiment, a copolymer of the invention may consist only of units of type A and units of type B.

Units of Type A

According to one particular embodiment of the invention, units of type A may derive from monomers selected from the group consisting of acrylic acid, methacrylic acid, ethacrylic acid, alpha-chloro-acrylic acid, bromo acrylic acid, bromomethyl acrylic acid, alpha-cyano acrylic acid, beta methyl-acrylic acid, alpha-phenyl acrylic acid, beta-acryloxy propionic acid, beta-carboxyethyl acrylic acid (oligomerised acrylic acid sold under tradename Sipomer B-CEA), sorbic acid, alpha-chloro sorbic acid, angelic acid, cinnamic acid, p-chloro cinnamic acid, beta-styryl acrylic acid, itaconic acid, maleic acid, citraconic acid, mesaconic acid, glutaconic acid, aconitic acid, fumaric acid, vinyl benzoic acid, pentenic acid, propyl acrylic acid, acetamido acrylic acid, maleimido propyl carboxylic acid and mixtures thereof.

Preferentially, units of type A derive from monomers selected from the group consisting of acrylic acid, methacrylic acid, ethacrylic acid, alpha-chloro-acrylic acid, bromo acrylic acid, bromomethyl acrylic acid, alpha-cyano acrylic acid, beta methyl-acrylic acid, alpha-phenyl acrylic acid, beta-acryloxy propionic acid, Beta-Carboxyethyl acrylic acid (oligomerised acrylic acid sold under tradename Sipomer B-CEA), cinnamic acid, itaconic acid, maleic acid, glutaconic acid, aconitic acid, fumaric acid, vinyl benzoic acid, propyl acrylic acid, maleimido propyl carboxylic acid and mixtures thereof.

These monomers are particularly well-suited for the synthesis of copolymers according to the invention via a controlled radical polymerization process as detailed hereafter.

According to a particularly preferred embodiment, units of type A of the first block and/or the second block derive from acrylic acid (AA) monomer.

Units of Type B

According to another particular embodiment, units of type B may derive from monomers selected from the group consisting of 2-acrylamido-2-methylpropanesulfonic acid, 2-methacrylamido-2-methylpropanesulfonic acid, 3-methyacrylamido-2-hydroxypropanesulfonic acid, (meth)allylsulfonic acid, 1-allyloxy-2-hydroxypropane sulfonic acid, allyloxybenzene sulfonic acid, (meth)allyloxybenzensulfonic acid, 2-hydroxy-3-(2-propenyloxy)propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethylacrylamid, sulfomethylmethacrylamid, water soluble salts thereof, and mixtures thereof.

Preferentially, units of type B derive from 2-acrylamido-2-methylpropanesulfonate (AMPS) monomers or sodium vinyl sulfonate (SVS) monomers.

More particularly, units B may derive from 2-acrylamido-2-methylpropanesulfonate (AMPS) monomer.

Of course, these different embodiments for units of type A and B may be combined together.

In a particularly preferred embodiment, said units of type A derive from acrylic acid monomer and said units of type B derive from 2-acrylamido-2-methylpropanesulfonate monomer.

First Block

According to one essential feature of the copolymer of the invention, it comprises at least one first block formed of at least 95 mol % of units A'; and having a degree of polymerization $DP_1$ comprised between 5 and 150.

Preferably, said first block comprises at least five consecutive units A'.

The term "formed of at least x mol % of units X" means that said units X represent more than x mol % of the total moles of units in said polymeric block.

In particular, said units A' may represent more than 99 mol % of the total moles of units of the first block.

According to a particular embodiment, said first block may only consist of units A' (except the optional presence of a transfer agent or initiator fragments at an end of the polymer chain).

According to a particular embodiment, the first block has a degree of polymerization $DP_1$ greater than or equal to 10, preferably greater than or equal to 20, more preferably comprised between 30 and 100, especially between 40 and 80 and notably between 50 and 65.

For example, the first block of a copolymer of the invention may have a degree of polymerization $DP_1$ of around 60.

The units A' may be chosen as previously indicated for units of type A.

According to a preferred embodiment, the units A' derive from acrylic acid monomer.

In particular, the first block may have a number average molar mass $Mn_1$ comprised between 400 and 11,000 g/mol, in particular between 2,000 and 7,000 g/mol, more particularly between 3,000 and 6,000 g/mol and notably between 3,500 and 5,000 g/mol.

Within the meaning of the invention, the average molar mass of a copolymer or a block refers to the number-average molar mass of said copolymer or block.

The number average molar mass is the arithmetic mean or average of the molar masses of the individual macromolecules. It is determined by measuring the molecular mass of n polymer molecules, summing the masses, and dividing by n.

The number average molar mass of a polymer can be determined experimentally by gel permeation chromatography.

The number average molar mass of a block can also be calculated from the amounts of monomers, initiators and/or transfer agents used to make said block. The one skilled in the art knows how to calculate these molar masses.

For example, in the examples of processes for the preparation of copolymers of the invention according to the MADIX method that follow, the theoretical number average molar mass is calculated according to the following equation for the case of a homopolymerisation (involving only one monomer):

$$\overline{Mn}(theo) = \frac{[M]_0}{[X]_0} \times M_{MU} + M_x$$

wherein: $Mn_{(theo)}$=Theoretical number average molar mass;
$[M]_0$=Initial monomer concentration;
$[X]_0$=Initial transfer agent concentration;
$M_{MU}$=Molar mass of monomer; and
$M_x$=Molar mass of the transfer agent.

The degree of polymerisation, noted $DP_n$ or DP, refers to the average degree of polymerisation and can be deduced by dividing the number average molar mass of the polymeric block, by the average molar mass $M_{AAm}$ of a monomer unit of the polymeric block: $DP_n = M_n/M_{AAm}$.

In the examples of processes for the preparation of copolymers of the invention according to the MADIX method that follow, the theoretical $DP_n$ is calculated according to the following equation for the case of a homopolymerisation (involving only one monomer):

$$DPn(theo) = \frac{[M]_0}{[X]_0}$$

wherein: $DP_{n(theo)}$=Theoretical $DP_n$;
$[M]_0$=Initial monomer molar concentration; and
$[X]_0$=Initial transfer agent concentration.

For a copolymerization system, the theoretical DPn can thus be calculated using the following equation:

$$DPn(theo) = \frac{[M_1]_0}{[X]_0} + \frac{[M_2]_0}{[X]_0}$$

wherein: $DP_{n(theo)}$=Theoretical $DP_n$;
[$M_1$]$_0$=Initial monomer concentration of monomer $M_1$;
[$M_2$]$_0$=Initial monomer concentration of monomer $M_2$; and
[X]$_0$=Initial transfer agent concentration.

Second Block

According to another essential feature of the copolymer of the invention, it comprises at least one second block formed of at least 95 mol % of units A" and of units B that are statistically distributed.

The expression "statistically distributed" means that the sequential distribution of the monomeric units A" and units B in the second block obeys known statistical laws.

In particular, said units A" and B may represent more than 99 mol % of the total moles of units of the second block.

According to a particular embodiment, said second block may only consist of units A" and B (except the optional presence of a transfer agent or initiator fragments at an end of the polymer chain).

According to another feature of said second block, the molar ratio of units A" to units B is greater than or equal to 1.

In particular, the molar ratio of units A" to units B in the second block may range from 50/50 to 90/10, in particular from 50/50 to 80/20.

According to a particular embodiment, the second block of a copolymer of the invention may present a molar ratio of units A" to units B of 75/25.

According to another feature of said second block, it presents a degree of polymerization $DP_2$ such that $DP_2/DP_1 \geq 1$.

In particular, the ratio $DP_2/DP_1$ may be less than or equal to 1,000, in particular less than or equal to 500, more particularly less than or equal to 200, and preferably less than or equal to 10.

More particularly, the second block may have a degree of polymerization $DP_2$ less than or equal to 2,000, in particular less than or equal to 1,000, more particularly comprised between 40 and 500, notably between 50 and 250.

For example, the second block may present a degree of polymerization $DP_2$ of around 60.

The units A" may be chosen as previously indicated for units of type A.

Preferably, said units A" derive from acrylic acid monomer.

According to a particular embodiment, units B of said second block may derive from 2-acrylamido-2-methylpropanesulfonate (AMPS) monomer or from sodium vinyl sulfonate (SVS) monomer.

According to an embodiment variant, the units A" of said second block derive from AA monomer and units B derive from AMPS monomer.

In particular, the second block may have a number average molar mass $Mn_2$ less than or equal to 280,000 g/mol, in particular less than or equal to 140,000 g/mol, more particularly less than or equal to 100,000 g/mol, notably comprised between 3,500 and 70,000 g/mol, more preferably between 4,000 and 35,000 g/mol.

The number average molar mass $Mn_2$ and degree of polymerisation $DP_2$ can be determined or calculated as explained above.

According to another embodiment variant, the second block of a copolymer of the invention is formed of at least 95 mol % of units A" deriving from AA monomer and of units B deriving from SVS monomer.

Of course, these different embodiments for first and second blocks according to the invention may be combined together.

As mentioned above, said units of type A of the first block (units A') may be identical to or different from said units of type A of the second block (units A").

According to a particularly preferred embodiment, both units A' of the first block and units A" of the second block derive from acrylic acid monomer.

In particular, in a first preferred embodiment variant, in a copolymer of the invention:
units A' of said first block derive from AA monomer;
units A" of said second block derive from AA monomers; and
units B of said second block derive from AMPS monomers.

In another particularly preferred embodiment variant, in a copolymer of the invention:
units A' of said first block derive from AA monomers;
units A" of said second block derive from AA monomers; and
units B of said second block derive from SVS monomers;

The copolymer of the invention may be a diblock copolymer, a triblock copolymer (for example, a copolymer (block 1)-(block 2)-(block 1) or (block 2)-(block 1)-(block 2)) or another multi-block copolymer.

According to a particularly preferred embodiment, the copolymer according to the invention is a diblock copolymer consisting of one first block and one second block as defined above.

The term "diblock copolymer" relates to an architecture formed of a block copolymer composed of two blocks and not substantially exhibiting another sequence of blocks.

More particularly, the copolymer used according to the invention may be a diblock copolymer (represented by the notation "PAA-b-(AA-stat-AMPS)"), consisting of:
one first block deriving from acrylic acid monomers with a degree of polymerization $DP_1$ comprised between 50 and 65, in particular around 60; and
one second block that is a statistical block deriving from acrylic acid and 2-acrylamido-2-methylpropane-sulfonate monomers with a molar ratio of AA units to AMPS units comprised between 50/50 and 80/20, said second block having a degree of polymerization $DP_2$ comprised between 50 and 250, in particular around 60.

According to a first variant, the copolymer used according to the invention may be a diblock copolymer (represented by the notation "PAA-b-(AA-stat-AMPS)"), consisting of:
one first block deriving from acrylic acid monomers with a degree of polymerization $DP_1$ comprised between 50 and 65, in particular around 60; and
one second block that is a statistical block deriving from acrylic acid and 2-acrylamido-2-methylpropane-sulfonate monomers with a molar ratio of AA units to AMPS units comprised between 50/50 and 80/20, in particular around 75/25, said second block having a degree of polymerization $DP_2$ comprised between 50 and 250, in particular around 60.

According to a second variant, the copolymer used according to the invention may be a diblock copolymer (represented by the notation "PAA-b-(AA-stat-AMPS)"), consisting of:
- one first block deriving from acrylic acid monomers with a degree of polymerization $DP_1$ comprised between 50 and 65, in particular around 60; and
- one second block that is a statistical block deriving from acrylic acid and 2-acrylamido-2-methylpropanesulfonate monomers with a molar ratio of AA units to AMPS units comprised between 50/50 and 80/20, in particular around 50/50, said second block having a degree of polymerization $DP_2$ comprised between 50 and 250, in particular around 80.

The copolymer of the invention can in particular exhibit a total number average molar mass Mn, less than 200,000, in particular ranging from 7,000 to 80,000 g/mol, preferably from 10,000 to 60,000 g/mol.

Preparation of the Copolymer

A copolymer of the invention can be prepared by any appropriate polymerization process known by the man skilled in the art.

Preferably, a copolymer of the invention can be prepared by a controlled or « living » polymerization process, in particular controlled radical polymerization process.

The controlled or living polymerization method makes it possible to prepare copolymers with a narrow dispersity and in which the length and the composition of the blocks are controlled by the stoechiometry and the degree of conversion.

Reference may in particular be made, as examples of "living" or "controlled" polymerization processes, to:
- the processes of applications WO 98/58974, WO 00/75207 and WO 01/42312, which employ a radical polymerization controlled by control agents of xanthate type,
- the radical polymerization process controlled by control agents of dithioester or trithiocarbonate type of application WO 98/01478,
- the radical polymerization process controlled by control agents of dithiocarbamate type of application WO 99/31144,
- the radical polymerization process controlled by control agents of dithiocarbazate type of application WO 02/26836,
- the radical polymerization process controlled by control agents of dithiophosphoric ester type of application WO 02/10223,
- the process of application WO 99/03894, which employs a polymerization in the presence of nitroxide precursors, or processes employing other nitroxides or nitroxide/alkoxyamine complexes,
- the process of application WO 96/30421, which uses an atom transfer radical polymerization (ATRP),
- the radical polymerization process controlled by control agents of iniferter type according to the teaching of Otu et al., Makromol. Chem. Rapid. Commun., 3, 127 (1982),
- the radical polymerization process controlled by iodine degenerative transfer according to the teaching of Tatemoto et al., Jap. 50, 127, 991 (1975), Daikin Kogyo Co Ltd Japan, and Matyjaszewski et al., Macromolecules, 28, 2093 (1995),
- the radical polymerization process controlled by tetraphenylethane derivatives disclosed by D. Braun et al. in Macromol. Symp., 111, 63 (1996), or also
- the radical polymerization process controlled by organocobalt complexes described by Wayland et al, in J. Am. Chem. Soc 116, 7973 (1994),
- the radical polymerization process controlled by diphenylethylene (WO 00/39169 or WO 00/37507).

Preferentially, a copolymer of the invention can be prepared by a controlled radical polymerization process.

According to a particularly preferred embodiment, a copolymer of the invention can be prepared by a controlled radical polymerization process employing a control agent comprising a transfer group of formula —S—CS—, known in particular under the names of RAFT (« Reversible addition fragmentation chain transfer ») or MADIX (« Macromolecular design by interchange of xanthates »).

The « transfer agent » or « control agent » is understood to mean an agent capable of bringing about controlled radical polymerization in the presence of unsaturated monomers and optionally of a source of free radicals.

Transfer agents of use for the implementation of a controlled radical polymerization process are known to a person skilled in the art and include agents comprising a group of formula —S—C(S)—Y—, —S—C(S)—S—, or —S—P(S)—Y—, or —S—P(S)—S—, wherein Y is an atom different from sulfur, such as an oxygen atom, a nitrogen atom, and a carbon atom. They include dithioester groups, thioether-thione groups, dithiocarbamate groups, dithiphosphoroesters, dithiocarbazates, and xanthate groups. Examples of groups comprised in preferred transfer agents include groups of formula —S—C(S)—NR—NR'$_2$, —S—C(S)—NR—N=CR'$_2$, —S—C(S)—O—R, —S—C(S)—CR=CR'$_2$, and —S—C(S)—X, wherein R and R', identical or different, are hydrogen atoms or organic groups such as hydrocarbyl groups, optionally substituted, optionally comprising heteroatoms, and X is an halogen atom.

Preferred transfer agents are in particular compounds comprising an —S—CS-transfer group (for example resulting from a xanthate) for the implementation of RAFT/MADIX polymerization processes.

Copolymers obtained by a living or controlled free-radical polymerization process may comprise at least one transfer agent group at an end of the polymer chain. In a particular embodiment, such a group is removed or deactivated.

The polymerization can be carried out in the presence of free radical initiators known to a person skilled in the art. Use may be made, for example, of sodium persulfate. It is typically possible to employ amounts of initiators of 1 to 100% by number, with respect to the amount of transfer agent.

Various sources of free radicals can be used. It is possible to generate free radicals by irradiation, in particular by UV irradiation, preferably in the presence of appropriate UV-sensitive initiators. It is possible to use initiators or initiator systems of radical or redox type. Use may in particular be made of the following initiators:
- hydrogen peroxides, organoperoxides, such as: tert-butyl hydroperoxide, cumene hydroperoxide, t-butyl peroxyacetate, benzoyl peroxide, potassium persulfate or ammonium persulfate,
- azo compounds, such as: 2,2'-azobisisobutyronitrile, 2,2'-azobis(2-butanenitrile), 4,4'-azobis(4-pentanoic acid), 2,2'-azobis {2-methyl-N-[1,1-bis(hydroxymethyl)-2-hydroxyethyl]propionamide}, 2,2'-azobis[2-methyl-N-(hydroxyethyl)propionamide], 2,2'-azobis(N,N'-dimethyleneisobutyramidine) dihydrochloride, 2,2'-azobis (2-amidinopropane) dihydrochloride, 2,2'-azobis(N,N'-dimethyleneisobutyramide), 2,2'-azobis{2-methyl-N-[1,1-bis(hydroxymethyl)-2-hydroxyethyl]

propionamide}, 2,2'-azobis{2-methyl-N-[1,1-bis (hydroxymethyl)ethyl]propionamide}, 2,2'-azobis[2-methyl-N-(2-hydroxyethyl)propionamide] or 2,2'-azobis(isobutyramide) dihydrate, redox systems comprising combinations, such as:

mixtures of hydrogen peroxide, alkyl peroxide, peresters, percarbonates and the like and of any iron salt, titanous salt, zinc formaldehydesulfoxylate or sodium formaldehydesulfoxylate, and reducing sugars, alkali metal or ammonium persulfates, perborates or perchlorates, in combination with an alkali metal bisulfite, such as sodium metabisulfite, and reducing sugars, and alkali metal persulfates in combination with an arylphosphinic acid, such as benzenephosphonic acid and others of a like nature, and reducing sugars.

The polymerization process can be a process of batch type or of semibatch type. A process of semibatch type typically comprises a step of gradual introduction of the monomers (comonomers) into a reactor during the polymer process.

The polymerization can advantageously be carried out in aqueous solution.

The polymerization, in particular by RAFT/MADIX method, is preferably operated at a temperature between 10° C. and 100° C., more preferably between 20° C. and 80° C.

Thus, for the preparation of block copolymers, it is possible to perform a first polymerization step in the presence of transfer agents to generate one of the blocks, and then a second polymerization step (the transfer groups still being present) with a monomer composition that is different than that of the preceding step, to generate another block, and optionally other polymerization steps with monomer compositions different than the one of the preceding step, to generate still another block.

For example, according to a particular embodiment, the process for the preparation of a di-block copolymer of the invention may comprise at least the steps consisting of:

(i) reacting monomer precursors of units A' in the presence of a transfer agent and optionally a free radical source compound, under appropriate conditions for obtaining said first block;

(ii) bringing the first block obtained in step (i) in the presence of monomer precursors of units A" and monomer precursors of units B, and optionally a free radical source compound under appropriate conditions for polymerizing the second block and obtaining the desired diblock copolymer; and optionally (iii) deactivating the transfer groups carried by the chains through for example oxidation and/or purifying the copolymer.

During the optional stage (iii), the block copolymers obtained or the hydrolysis byproducts can be subjected to a reaction for purification from or destruction of certain entities, for example by processes of hydrolysis, oxidation, reduction, pyrolysis, ozonolysis or substitution type. A stage of oxidation with aqueous hydrogen peroxide solution is particularly appropriate for treating sulfur-comprising entities.

Of course, other process variants can be used. For example, the so-called second block may be polymerized in a first step, followed by the polymerization of the so-called first block.

In the same way, the man skilled in the art can adjust the controlled radical polymerization process to make other multi-block copolymers according to the invention.

These processes for the preparation of multi-block copolymers are known to a person skilled in the art. It is especially possible to prepare triblock copolymers (bloc 1)-(bloc 2)-(bloc 1) for example, in two polymerization sequences, using agents comprising two transfer groups or agents comprising a transfer group allowing a transfer at each end of the group, for example a trithiocarbonate comprising a group of formula —S—CS—S—.

Of course, the person skilled in the art can adjust the operating conditions in a known and appropriate way (the source of free radicals, the amount of free radicals, the steps for introducing the various compounds (monomers, source of free radicals, and the like), the polymerization temperature) to obtain the desired copolymer.

According to this process, if all the successive polymerizations are carried out in the same reactor, it is generally preferable for all the monomers used during one stage to have been consumed before the polymerization of the following stage begins, therefore before the new monomers are introduced. However, it may happen that monomers of the preceding stage are still present in the reactor during the polymerization of the following block. In this case, the monomers generally do not represent more than 5 mol % of all the monomers.

Detergent Composition

As specified previously and clearly illustrated by the following examples, the copolymers according to the present invention are useful as anti-filming agents in detergent compositions.

In particular, the copolymer(s) of the invention is/are used in said detergent composition in an amount which is effective in preventing, limiting or eliminating the filming phenomena.

Preferentially, the copolymer(s) of the invention is present in the detergent composition in an amount ranging from 0.001 to 10% by weight relative to the total weight of the composition, in particular from 0.01 to 10% by weight, more particularly from 0.1 to 9% by weight, preferably from 0.2 to 8% by weight and more preferably from 0.5 to 7% by weight. For example, the detergent composition may comprise around 5% by weight of copolymer(s) according to the invention.

Applications

As above-mentioned, a detergent composition according to the invention is particularly advantageous in the context of the cleaning of transparent items, in particular of transparent items of the dishes, especially made of glass.

Thus, according to a first embodiment variant, a composition according to the invention is a cleaning or rinsing composition, for washing kitchenware, by hand or using an automatic machine. In a preferred embodiment, the composition is a detergent automatic dishwashing (ADW) composition.

Said composition makes it possible to prevent the deposition of insoluble calcium mineral salts (calcium carbonate, calcium phosphate, etc.) and advantageously enables a reduction of films after the washing. This allows making utensils and dining sets sparkle after the washing, especially washing in ADW.

For obvious reasons, the use of a copolymer of the invention as anti-filming agent is not limited to detergent compositions for dishes, by hand or using an automatic device.

The copolymers of the invention can more generally be used in various household care compositions, especially for treating, preferably cleaning, of hard surfaces, the copolymer being used as anti-filming agent.

The household cleaning operations include maintenance performed within the private residential sector, and within the public institutional or industrial sector, for example in offices, hotels, restaurants or schools, where appropriate by service companies.

The term "hard surfaces" should be taken in the broad sense; these are nontextile surfaces, which may be household, public or industrial surfaces.

They may be made of any material, especially such as:
ceramic (surfaces such as sinks, baths, wall or floor tiles, toilet pans, etc.),
glass (surfaces such as interior and exterior glazing of buildings or vehicles, mirrors),
metal (surfaces such as inner or outer walls of reactors, blades, panels, tubes, etc.),
synthetic resins (for example bodyworks or interior surfaces of motorized vehicles (cars, trucks, buses, trains, aircraft, etc.), surfaces made of melamine or Formica for the interior of offices, kitchens, etc.)),
plastics (for example polyvinyl chloride, polyamide, for the interior of vehicles, especially cars).

The "hard surfaces" according to the invention are sparingly porous and nonfibrillar surfaces; they should thus be distinguished from textile surfaces (fabrics, carpets, clothing, etc. made of natural, artificial or synthetic materials).

The composition according to the invention may especially afford the hard surfaces to be treated anti-filming properties. The composition may be for example:
a cleaning or rinsing composition for household use; it may be multi-purpose or may be more specific, such as a cleaning or rinsing composition:
for bathrooms; said composition especially prevents the growth and/or deposition of inorganic salts crystals (calcium carbonate, etc.);
for glazing or mirrors; said compositions makes it possible to prevent the deposition of mineral particulate soiling (inorganic salts crystals (calcium carbonate, etc.)) on the surface;
a cleaning or rinsing composition for industrial or public-sector use; it may be multi-purpose or more specific, such as a composition for cleaning
reactors, stainless-steel blades, sinks and tanks, kitchenware,
exterior or interior surfaces of buildings,
glazings of residential and nonresidential buildings, bottles.

The composition according to the invention may be in any form and may be used in many ways.

Thus, it may be in the form:
of a gelled or non-gelled liquid, to be deposited in its native form, especially by spraying,
directly onto the surfaces to be cleaned or rinsed, or
onto a sponge or another support (for example a woven or nonwoven cellulose article) before being applied to the surface to be treated,
of a gelled or non-gelled liquid, to be diluted in water (optionally containing another solvent) before being applied to the surface to be treated,
of a yelled or non-yelled liquid, enclosed in a water-soluble sachet,
of a foam,
of an aerosol,
of a liquid absorbed onto an absorbent support made especially of a woven or nonwoven article (wipe),
of a solid, especially a tablet or powder, optionally enclosed in a water-soluble sachet, said composition possibly representing all or part of the tablet or powder.

According to a preferred embodiment, the composition of the invention especially for ADW, is in the form of a gelled or non gelled liquid, tablet or powder, possibly enclosed in a water-soluble sachet.

In a preferred embodiment, the detergent composition according to the invention is in the form of tablet or powder, preferentially in the form of tablet.

The choice and quantity of the ingredients included in the detergent composition in view of its form and application is clearly within the competence of the person skilled in the art.

In still another embodiment variant of the invention, a copolymer of the invention may be used in cleaning or rinsing composition for textile surfaces, for example clothes.

Said composition makes it possible to trap the calcium ions, thus avoiding the interactions with anionic surfactants, which improves detergence. In particular, it was discovered that AA and SVS-based copolymers according to the invention exhibit good performance as builder materials for this application.

Other Ingredients

In addition to the copolymer described herein above, the detergent composition, especially for ADW, according to the invention may comprise conventional ingredients, preferably selected from alkalinity sources, builders (i.e. detergency builders including the class of chelating agents/sequestering agents), fillers, bleaching systems, antiscalants, corrosion inhibitors, surfactants, antifoams, and/or enzymes. The pH of the detergent composition typically is in the alkaline region, preferably greater than 9, more preferably greater than 10.

Suitable caustic agents include alkali metal hydroxides, e.g. sodium or potassium hydroxides, and alkali metal silicates, e.g. sodium metasilicate. Especially effective is sodium silicate having a mole ratio of $SiO_2Na_2O$ of from about 1.0 to about 3.3, preferably from about 1.8 to about 2.2, normally referred to as sodium disilicate.

Builder Materials

Suitable builder materials (phosphates and non-phosphate builder materials) are well known in the art.

The builder material usable herein can be any one or mixtures of the various known phosphate and non-phosphate builder materials. Examples of suitable non-phosphate builder materials are the alkali metal citrates, carbonates and bicarbonates; and the salts of nitrilotriacetic acid (NTA); methylgiycine diacetic acid (MGDA); glutaric di acetic acid (GLDA), polycarboxylates such as polymaleates, polyacetates, polyhydroxyacrylates, poly-acrylate/polymaleate and polyacrylate/polymethacrylate copolymers, as well as zeolites; layered silicas and mixtures thereof.

The weight ratio of those builders regarding the total weight of the composition is the typical weight ratio in the ADW composition application, e.g. it is comprised between 1 and 70, preferably 5 and 60, more preferably 10 and 60.

Advantageously, the composition of the invention does not comprise phosphate builders.

Fillers

As examples of fillers, mention may be made of sodium sulfate, sodium chloride, sodium carbonate or calcium carbonate, kaolin or silica, in particular in a proportion of from 0 to 50% of the total weight of said composition.

Antiscalants

The antiscalants are those typically known by the person skilled in the art, these include polyacrylates of number average molar mass from 1,000 to 400,000 examples of which are supplied by Dow, BASF and AkzoNobel; and polymers based on acrylic acid combined with other moieties. These include acrylic acid combined with maleic acid, such as Sokalan CP5 and CP7 supplied by BASF or Acusol 479N supplied by Dow; with phosphonate such as Casi 773 supplied by Buckman Laboratories; with maleic acid and vinyl acetate such as polymers supplied by Huls; with acrylamide; with sulfophenol methallyl ether such as Aquatreat AR 540 supplied by AkzoNobel; with 2-acrylamido-2-methylpropane sulfonic acid such as Acusol 587D supplied by Dow or such as K-775 supplied by Goodrich; with 2-acrylamido-2-methylpropane sulfonic acid and sodium styrene sulfonate such as K-798 supplied by Goodrich; with methyl methacrylate, sodium methallyl sulfonate and sulfophenol methallyl ether such as Alcosperse 240 supplied by AkzoNobel; polymaleates such as Belclene 200 supplied by BWA; polymethacrylates such as Tamol 850 from Dow; polyaspartates; ethylenediamine disuccinate; organo polyphosphonic acids and their salts such as the sodium salts of amino tri(methylenephosphonic acid) and ethane 1-hydroxy-1,1-diphosphonic acid.

The weight ratio of anti-scalant regarding the total weight of the composition is ratio typically known from the person skilled in the art, especially comprised between 0.05% to about 10% by weight, preferably from 0.1% to about 10% by weight, most preferably from about 0.2% to about 10% by weight.

In a particular variant, the detergent composition of the invention is free of any antiscalant agent other than said copolymer(s) of the invention.

Surfactants

Surfactants and especially nonionics may be present to enhance cleaning and/or to act as defoamer. Typically used nonionics are obtained by the condensation of alkylene oxide groups with an organic hydrophobic material which may be aliphatic or alkyi aromatic in nature, e.g. selected from the group consisting of a $C_2$-$C_{18}$ alcohol alkoxylate having EO, PO, BO and PEO moieties or a polyalkylene oxide block copolymer.

The surfactant may be present in a concentration of about 0% to about 10% by weight, preferably from 0.5% to about 5% by weight, most preferably from about 0.2% to about 3% by weight.

Bleaches

Suitable bleaches for use in the system according the present invention may be halogen-based bleaches or oxygen-based bleaches. More than one kind of bleach may be used.

As halogen bleach, alkali metal hypochlorite may be used. Other suitable halogen bleaches are alkali metal salts of di- and tri-chloro and di- and tri-bromo cyanuric acids. Suitable oxygen-based bleaches are the peroxygen bleaches, such as sodium perborate (terra- or monohydrate), sodium carbonate or hydrogen peroxide.

The amounts of hypochlorite, di-chloro cyanuric acid and sodium perborate or percarbonate preferably do not exceed 15%, and 25% by weight, respectively, e.g. from 1-10% and from 4-25% by weight, respectively.

Enzymes

Amylolytic and/or proteolytic enzymes would normally be used as an enzymatic component. The amylolytic enzymes usable herein can be those derived from bacteria or fungi.

Minor amounts of various other components may be present in the chemical cleaning system. These include solvents, and hydrotropes such as ethanol, isopropanol and xylene sulfonates, flow control agents; enzyme stabilizing agents; anti-redeposition agents; corrosion inhibitors; and other functional additives.

Amphoteric Copolymers

According to one particular embodiment, a detergent composition according to the invention, especially for ADW, may further comprise at least one amphoteric copolymer, as rinse-aid agents.

Said amphoteric copolymer may be more particularly a water-soluble or water-dispersible copolymer comprising, in the form of polymerized units:

(a) at least one monomer compound of general formula I:

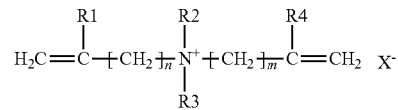

in which:
  $R_1$ and $R_4$, independently of each other, represent a hydrogen atom or a linear or branched $C_1$-$C_5$ alkyl group;
  $R_2$ and $R_3$, independently of each other, represent an alkyl, hydroxyalkyl or aminoalkyl group in which the alkyl group is a linear or branched $C_1$-$C_5$ chain, preferably a methyl group;
  n and m are integers between 1 and 3;
  X, which may be identical or different, represent counterions which are compatible with the water-soluble or water-dispersible nature of the polymer;
(b) at least one hydrophilic monomer bearing a function of acidic nature which is copolymerizable with (a) and capable of ionizing in the application medium,
(c) optionally, at least one hydrophilic monomer compound containing ethylenic unsaturation and of neutral charge, bearing one or more hydrophilic groups, which is copolymerizable with (a) and (b), in which the a/b molar ratio is between 60/40 and 5/95.

Preferably, $R_1$ represents hydrogen; $R_2$ represents methyl; $R_3$ represents methyl; $R_4$ represents hydrogen, and m and n are equal to 1.

The ion $X^-$ is advantageously chosen from halogen, sulfate, hydrogen sulfate, phosphate, citrate, formate and acetate.

The monomer (a) gives the amphoteric copolymer properties of interaction with the surface to be treated, in particular allowing anchoring of the copolymer to this surface.

The monomer (b) and optionally the monomer (c) give the amphoteric copolymer hydrophilic properties which, after anchoring the copolymer to the surface to be treated, are transmitted to this surface.

This hydrophilic property of the surface moreover reduces the formation of mist on the surface; this benefit can be exploited in particular in cleaning formulations for glass panels and mirrors, in particular in bathrooms.

The amphoteric copolymer may have a weight-average molecular mass of at least 1000 g/mol, advantageously of at least 10,000 g/mol; it can be up to 20,000,000 g/mol, advantageously up to 10,000,000 g/mol.

The amphoteric copolymer is preferably a random copolymer.

The monomer (a) preferably has the following structure:

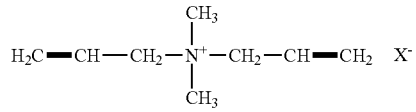

X⁻ being as defined above.

One monomer which is particularly preferred is that of the above formula in which $X^-$ represents $Cl^-$, this monomer being known as DADMAC (for diallyldimethylammonium chloride).

The monomers (b) are advantageously water-soluble $C_3$-$C_8$ carboxylic, sulfonic, sulfuric, phosphonic or phosphoric acids containing monoethylenic unsaturation, anhydrides thereof and water-soluble salts thereof.

Among the preferred monomers (b) which may be mentioned are acrylic acid, methacrylic acid, α-ethacrylic acid, β,β-dimethacrylic acid, methylenemalonic acid, vinylacetic acid, allylacetic acid, ethylideneacetic acid, propylideneacetic acid, crotonic acid, maleic acid, fumaric acid, itaconic acid, citraconic acid, mesaconic acid, N-methacryloylalanine, N-acryloylhydroxyglycine, sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, and the ammonium and alkali metal salts of these acids.

Among the monomers (c) which may be mentioned are acrylamide, vinyl alcohol, $C_1$-$C_4$ alkyl esters of acrylic acid and of methacrylic acid, $C_1$-$C_4$ hydroxyalkyl esters of acrylic acid and of methacrylic acid, in particular ethylene glycol and propylene glycol acrylate and methacrylate, polyalkoxylated esters of acrylic acid and of methacrylic acid, in particular the polyethylene glycol and polypropylene glycol esters.

The monomer (a) content is advantageously between 5 mol % and 60 mol %, preferably 20 mol % to 50 mol %.

The monomer (b) content is advantageously between 10 mol % and 95 mol %, preferably 20 mol % to 80 mol %.

The monomer (c) content is advantageously between 0 mol % and 50 mol %, preferably 5 mol % to 30 mol %.

The a/b molar ratio is preferably between 50/50 and 10/90.

Said amphoteric copolymer(s) may be present in an amount ranging from 0.001% to 10%, in particular from 0.05% to 8% by weight, relative to the total weight of the detergent composition, in particular from 0.1% to 5% by weight.

These amphoteric copolymers are particularly useful to avoid the formation of droplets after the rinsing and, thus, to provide anti-spotting properties.

Advantageously, a detergent composition according to the invention may thus combine good anti-spotting and anti-filming properties.

A few particular embodiments and applications of a composition of the invention are detailed hereinbelow.

Thus, the composition according to the invention may be used for the facilitated cleaning treatment of glass surfaces, especially glazing. This treatment may be performed by various known techniques. Mention may be made in particular of the cleaning of glazing by spraying with a jet of water using devices of Karcher® type.

The amount of copolymer of the invention introduced will generally be such that, during the use of the cleaning composition, after optional dilution, the concentration of copolymer is between 0.001 g/l and 2 g/l and preferably between 0.005 g/l and 0.5 g/l.

The glazing cleaning composition according to the invention may comprise:
from 0.001% to 10% and preferably from 0.005% to 3% by weight of the copolymer of the invention;
from 0.005% to 20% and preferably from 0.5% to 10% by weight of at least one nonionic surfactant (for example an amine oxide or an alkylpolyglucoside) and/or an anionic surfactant; and
the rest being formed from water and/or various additives that are common in the field.

The glazing cleaning formulations comprising said copolymer of the invention may also contain:
from 0 to 10% and advantageously from 0.5% to 5% of amphoteric surfactant,
from 0 to 30% and advantageously from 0.5% to 15% of solvent such as alcohols, and
the rest being formed from water and common additives (especially fragrances).

The pH of the composition is advantageously between 6 and 11.

The composition of the invention is also advantageous for the facilitated cleaning of kitchenware in an automatic machine. Said composition may be either a detergent (cleaning) formulation used in the wash cycle, or a rinsing formulation.

The detergent compositions for washing kitchenware in automatic dishwashers according to the invention advantageously comprise from 0.01% to 5% and preferably 0.1% to 3% by weight of the copolymer of the invention.

Said dishwasher detergent compositions also comprise at least one surfactant, preferably a nonionic surfactant, in an amount that may range from 0.2% to 10% and preferably from 0.5% to 5% of the weight of said detergent composition, the rest being formed from various additives and fillers, as already mentioned above. Thus, they may also comprise:
up to 90% by weight of at least one detergency adjuvant ("builder") of sodium silicate or tripolyphosphate type,
up to 10%, preferably from 1% to 10% and most particularly from 2% to 8% by weight of at least one auxiliary cleaning agent, preferably a copolymer of acrylic acid and of methylpropanesulfonic acid (MPSA),
up to 30% by weight of at least one bleaching agent, preferably perborate or percarbonate, optionally combined with a bleaching activator,
up to 50% by weight of at least one filler, preferably sodium sulfate or sodium chloride.

The pH is advantageously between 8 and 13.

The compositions for the facilitated rinsing of kitchenware in an automatic dishwasher according to the invention may advantageously comprise from 0.02% to 10% and preferably from 0.1%. to 5% by weight of the copolymer of the invention relative to the total weight of the composition.

Said compositions may also comprise from 0.1% to 20% and preferably 0.2% to 15% by weight, relative to the total weight of said composition, of a surfactant, preferably a nonionic surfactant.

Among the preferred nonionic surfactants, mention may be made of surfactants such as polyoxyethylenated $C_6$-$C_{12}$ alkylphenols, polyoxyethylenated and/or polyoxypropylenated $C_8$-$C_{22}$ aliphatic alcohols, ethylene oxide-propylene oxide block copolymers, optionally polyoxyethylenated carboxylic amides, etc.

Said compositions may also comprise from 0 to 10% and preferably from 0.5% to 5% by weight, relative to the total weight of the composition, of a calcium-sequestering organic acid, preferably citric acid.

They may also comprise an auxiliary agent such as a copolymer of acrylic acid and of maleic anhydride or acrylic acid homopolymers in a proportion of from 0 to 15% and preferably 0.5% to 10% by weight relative to the total weight of said composition.

The pH is advantageously between 4 and 7.

A subject of the invention is also a cleaning composition for the facilitated washing of kitchenware by hand.

Preferred detergent formulations of this type comprise from 0.1 to 10 parts by weight of the copolymer of the invention per 100 parts by weight of said composition and contain from 3 to 50 and preferably from 10 to 40 parts by weight of at least one surfactant, preferably an anionic surfactant, chosen especially from saturated $C_5$-$C_{24}$ and preferably $C_8$-$C_{16}$ aliphatic alcohol sulfates, optionally condensed with about 0.5 to 30, preferably 0.5 to 8 and most particularly 0.5 to 5 mol of ethylene oxide, in acidic form or in the form of a salt, especially an alkali metal (sodium), alkaline-earth metal (calcium, magnesium), etc. salt.

They are preferentially foaming liquid detergent aqueous formulations for the facilitated washing of kitchenware by hand.

Said formulations may also contain other additives, especially other surfactants, such as:
- nonionic surfactants such as amine oxides, alkylglucamides, alkyl polyglucosides, oxyalkylenated derivatives of fatty alcohols, alkylamides, alkanolamides, and amphoteric or zwitterionic surfactants,
- noncationic bactericides or disinfectants such as triclosan, synthetic cationic polymers,
- polymers for controlling the viscosity of the mixture and/or the stability of the foams formed on use,
- hydrotropic agents,
- skin moisturizers or humectants or protectors,
- dyes, fragrances, preserving agents, divalent salts (especially of magnesium), etc.

The pH of the composition is advantageously between 5 and 9.

Another particular embodiment of the invention consists of a composition for the facilitated external cleaning, especially of the bodywork, of motorized vehicles (cars, trucks, buses, trains, aircraft, etc.).

In this case also, it may be an actual cleaning composition or a rinsing composition.

The cleaning composition for motor vehicles advantageously comprises from 0.005% to 10% by weight of the copolymer of the invention relative to the total weight of said composition, and also:
- nonionic surfactants (in a proportion of from 0 to 30% and preferably from 0.1% to 15% of the formulation),
- amphoteric and/or zwitterionic surfactants (in a proportion of 0 to 30% and preferably from 0.01% to 10% of the formulation),
- cationic surfactants (in a proportion of from 0 to 30% and preferably from 0.05% to 15% of the formulation);
- anionic surfactants (in a proportion of 0 to 30% and preferably from 0.1% to 15% of the formulation);
- detergency adjuvants ("builders") (in a proportion of from 1% to 99% and preferably from 40% to 98% of the formulation);
- hydrotropic agents;
- fillers, pH regulators, etc.

The minimum amount of surfactant present in this type of composition is preferably at least 0.5% of the formulation.

The pH of the composition is advantageously between 8 and 13.

The composition of the invention is also particularly suitable for the facilitated cleaning of hard surfaces of ceramic type (tiles, baths, sinks, etc.), especially for bathrooms. It may especially prevent the growth and/or deposition of inorganic salts crystals (calcium carbonate, etc.) on these surfaces.

The cleaning formulation advantageously comprises from 0.02% to 5% by weight of the copolymer of the invention relative to the total weight of said composition, and also at least one surfactant.

Preferred surfactants include nonionic surfactants, especially the compounds produced by condensation of alkylene oxide groups of hydrophilic nature with a hydrophobic organic compound that may be of aliphatic or alkylaromatic nature.

The length of the hydrophilic chain or of the polyoxyalkylene radical condensed with any hydrophobic group may be readily adjusted to obtain a water-soluble compound having the desired degree of hydrophilic/hydrophobic balance (HLB).

The amount of nonionic surfactants in the composition of the invention may be from 0 to 30% by weight and preferably from 0 to 20% by weight.

An anionic surfactant may optionally be present in an amount of from 0 to 30% and advantageously 0 to 20% by weight.

It is also possible but not obligatory to add amphoteric, cationic or zwitterionic detergents.

The total amount of surfactant compounds used in this type of composition is generally between 0.5% and 50%, preferably between 1% and 30% by weight and more particularly between 2% and 20% by weight relative to the total weight of the composition.

Said cleaning composition may also comprise other minor ingredients, such as:
- detergency adjuvants ("builders") as mentioned previously (in an amount that may be between 0.1% and 25% by weight relative to the total weight of the composition),
- a foam regulator, as mentioned above, especially of soap type (in an amount generally of at least 0.005% by weight and preferably from 0.5% to 2% by weight relative to the total weight of the composition),
- pH regulators, dyes, optical brighteners, soiling suspension agents, detergent enzymes, compatible bleaching agents, agents for regulating the formation of gel, freezing-thawing stabilizers, bactericides, preserving agents, solvents, fungicides, insect repellents, hydrotropic agents, fragrances and opacifiers or pearlescent agents.

The pH of the composition is advantageously between 2 and 12.

The composition according to the invention is also suitable for the facilitated rinsing of shower walls.

The aqueous compositions for rinsing shower walls comprise from 0.02% to 5% by weight and advantageously from 0.05% to 1% of the copolymer of the invention.

The other main active components of the aqueous shower rinsing compositions of the present invention are at least one surfactant present in an amount ranging from 0.5% to 5% by weight and optionally a metal-chelating agent as mentioned above, present in an amount ranging from 0.01% to 5% by weight.

The aqueous shower rinsing compositions advantageously contain water with, optionally, at least one lower alcohol in major proportion and additives in minor proportion (between about 0.1% and about 5% by weight, more advantageously between about 0.5% and about 3% by weight and even more preferentially between about 1% and about 2% by weight).

Certain surfactants that may be used in this type of application are described in patents U.S. Pat. Nos. 5,536,452 and 5,587,022, the content of which is incorporated by reference into the present description.

Preferred surfactants are polyethoxylated fatty esters, for example polyethoxylated sorbitan oleates and polyethoxylated castor oil. Particular examples of such surfactants are the products of condensation of 20 mol of ethylene oxide and of sorbitan monooleate (sold by Rhodia Inc. under the name Alkamuls PSMO-20® with an HLB of 15.0) and 30 or 40 mol of ethylene oxide and castor oil (sold by Rhodia Inc. under the name Alkamuls EL-620® (HLB of 12.0) and EL-719® (HLB of 13.6), respectively). The degree of ethoxylation is preferably sufficient to obtain a surfactant with an HLB of greater than 13.

The pH of the composition is advantageously between 7 and 11.

The composition according to the invention may also be used for the facilitated cleaning of vitroceramic plates.

Advantageously, the formulations for cleaniny vitroceramic plates of the invention comprise:
0.01% to 5% by weight of the copolymer of the invention;
0.1% to 1% by weight of a thickener such as a xanthan gum;
10% to 60% by weight of an abrasive agent such as calcium carbonate or silica;
0 to 7% by weight of a solvent such as butyldiglycol;
1% to 10% by weight of a nonionic surfactant; and
optionally basifying agents or sequestrants.

The pH of the composition is advantageously between 7 and 12.

As mentioned above, the composition according to the invention may also be used in the field of industrial cleaning, especially for the facilitated cleaning of reactors.

Advantageously, said compositions comprise:
from 0.02% to 5% by weight of the copolymer of the invention;
from 1% to 50% by weight of alkali metal salts (sodium or potassium phosphates, carbonates, silicates);
from 1% to 30% by weight of a mixture of surfactants, especially of nonionic surfactants such as ethoxylated fatty alcohols and anionic surfactants such as lauryl benzene sulfonate;
from 0 to 30% by weight of a solvent such as diisobutyl ester.

The pH of such a composition is generally from 8 to 14.

For obvious reasons, the invention is by no means limited to these particular embodiments and applications.

The invention will now be described in further details using the following non-limiting examples.

EXAMPLES

In the following examples 1 to 8, determination of the weight average molar mass ($M_w$) and number average molar mass ($M_n$) of the macromolecular distributions of the (co) polymers was performed by GPC-MALS Gel Permeation chromatography—MultiAngle Light Scattering.

The elution conditions were the following:
Mobile phase: Deionised water, NaCl 100 mM, $NaH_2PO_4$ 25 mM,
$Na_2HPO_4$ 25 mM.
Flow rate: 1 ml/min
Columns: Varian Aquagel mixed 8 μm (3 columns×30 cm)
Detection: Refractive Index (Agilent concentration detector)+MALS (Treos Minidawn)
Sample concentration: around 0.5% by weight of dry matter in the mobile phase
Injection loop: 100 μl
Dn/dc: 0.15.

Residual monomers were measured by high-performance liquid chromatography (HPLC).

Example 1

Synthesis of the Polymer PAA (DPn 60; $Mn_{th}$ 4533 g/Mol)

Into a 1 L double jacketed reactor equipped with mechanical agitator and reflux condenser was added 6.25 g of O-ethyl-S-(1-methoxycarbonylethyl)xanthate ($CH_3CH(CO_2CH_3)$)S(C=S)OEt), 56.4 g of Ethanol, and 225.7 g of De-ionised water and 19.5 g of acrylic acid. The reactor contents were heated to 70° C. under agitation whereupon 13.2 g of a solution of 10 wt % V-50 (2,2'-Azobis(2-methylpropionamidine) dihydrochloride) was added in 1 shot. Immediately thereafter, a feed of 110.3 g of acrylic acid was added to the reactor over 3 h by means of a syringe pump. At the same time 39.7 g of a solution of 10 wt % V50 was added over 3 h 10 minutes by means of a syringe pump. Once the initiator feed had ended, the reaction mixture was aged at 70° C. for a further hour whereupon it was cooled to ambient temperature and discharged. The pH of the reaction mixture was then adjusted to 2.5 using a 50% wt solution of NaOH. The ethanol was stripped from the reaction mixture by distillation using a rotary evaporator (Bath temperature 50° C., 120-50 mbar) and deionized water back added to keep the polymer concentration constant (around 30%). The measured solids content was 31.3% (115° C., 60 mins).

Dexanthation 50 g of polymer solution was placed in a 250 ml 2 necked round bottomed flask equipped with a magnetic stirrer bar. The pH of the solution was increased to 8.5 using a 50% solution of NaOH. The mixture was heated to 70° C. with stirring whereupon 1.17 g of a 30% solution of hydrogen peroxide was added in 1 shot. After 15 minutes, a further 1.17 g shot of hydrogen peroxide (30%) was added. The addition was repeated at 30 minutes and at 45 minutes. At the end of the additions, the solution was aged for a further 3 h 45 whereupon it was cooled and discharged. Dexanthation was confirmed using GPC analysis equipped with RI and UV (290 nm) detection.

The weight average molar mass was 4773 g/mol and number average molar mass as measured by the GPC technique described above was 3912 g/mol. The residual acrylic acid as measured by HPLC was <10 ppm.

Example 2

Synthesis of the Copolymer
PAA-b-(AA-Stat-AMPS) (DPn 60-60; Ratio AA/AMPS 75/25 Mol %)

i. Synthesis of the First Block PAA (DPn 60)

Into a 1 L double jacketed reactor equipped with mechanical agitator and reflux condenser was added 6.25 g of O-ethyl-S-(1-methoxycarbonylethyl)xanthate ($CH_3CH(CO_2CH_3)$)S(C=S)OEt), 19.46 g of Acrylic acid, 56.4 g of Ethanol, and 225.7 g of De-ionised water. The reactor contents were heated to 70° C. under agitation whereupon 13 g of a solution of 10 wt % V-50 (2,2'-Azobis(2-methylpropionamidine) dihydrochloride) was added in 1 shot. Immediately thereafter, a feed of 110 g of acrylic acid was added to the reactor over 3 h by means of a syringe pump. At the same time 39.7 g of a solution of 10% wt V50 was added over 3 h 10 minutes by means of a syringe pump. Once the initiator feed had ended, the reaction mixture was aged at 70° C. for a further hour whereupon it was cooled to ambient temperature and discharged. The pH of the reaction mixture was then adjusted to 2.5 using a 50% wt solution of NaOH. The ethanol was stripped from the reaction mixture by distillation using a rotary evaporator (Bath temperature 50° C., 120-50 mbar) and deionized water back added to keep the polymer concentration constant (around 30%). The measured solids content was 31.3% (115° C., 60 mins).

ii. Synthesis of the Second Block AA-s-AMPS (DPn 60; Ratio AA/AMPS 75/25 Mol %2

Into a 500 mL double jacketed reactor equipped with mechanical agitator and reflux condenser was added 126.3 g of a 31.3% solution of the 1$^{st}$ block, 4.05 g of Acrylic acid, 8.6 g of a 50% solution of 2-Acrylamido-2-methylpropane sulfonic acid (AMPS), and 47.8 g of De-ionised water. The reactor contents were heated to 75° C. under agitation whereupon 9.6 g of a solution of 10 wt % sodium persulphate (NaPS) was added in 1 shot. Immediately thereafter, a feed of 22.95 g of acrylic acid was added to the reactor over 2 h by means of a syringe pump. At the same time 48.71 g of a 50% solution of AMPS added over 2 h by means of a syringe pump. Once the monomer feeds had ended further 9.6 g of a 10% solution of NaPS were added to the reactor and the reaction mixture was aged at 75° C. for a further 4 hours whereupon it was cooled to ambient temperature and discharged. The measured solids content was 38.65% (115° C., 60 mins).

150 g of polymer solution was placed in a 250 ml 2 necked round bottomed flask equipped with a magnetic stirrer bar. The pH of the solution was increased to 8.5 using a 50% solution of NaOH. The mixture was heated to 70° C. with stirring whereupon 1.84 g of a 30% solution of hydrogen peroxide was added in 1 shot. After 15 minutes, a further 1.84 g shot of hydrogen peroxide (30%) was added. The addition was repeated at 30 minutes and at 45 minutes. At the end of the additions, the solution was aged for a further 3 h 45 whereupon it was cooled and discharged. Dexanthation was confirmed using GPC analysis equipped with RI and UV (290 nm) detection.

The weight average molar mass was 20720 g/mol and number average molar mass as measured by the GPC technique described above was 10170 g/mol. The residual acrylic acid as measured by HPLC was <10 ppm and the residual AMPS monomer was <20 ppm. The solids content was 34.5% (100° C., 60 minutes).

Example 3

Synthesis of the Copolymer PAA-b-(AA-Stat-AMPS) (DPn 60-200; Ratio AA/AMPS 75/25 Mol %)

i. Synthesis of the First Block PAA (DPn 60)

Into a 500 mL double jacketed reactor equipped with mechanical agitator and reflux condenser was added 7.7 g of O-ethyl-S-(1-methoxycarbonylethyl)xanthate (CH$_3$CH (CO$_2$CH$_3$))S(C=S)OEt), 38.9 g of Ethanol, and 38.9 g of De-ionised water. The reactor contents were heated to 70° C. under agitation whereupon 12.54 g of a solution of 5 wt % V-50 (2,2'-Azobis(2-methylpropionamidine) dihydrochloride) was added in 1 shot. Immediately thereafter, a feed of 345.4 g of a solution of 46.3 wt % acrylic acid was added to the reactor over 3 h by means of a syringe pump. At the same time 50.0 g of a solution of 3.7 wt % V50 was added over 3 h 10 minutes by means of a syringe pump. Once the initiator feed had ended, the reaction mixture was aged at 70° C. for a further hour whereupon it was cooled to ambient temperature and discharged. The pH of the reaction mixture was then adjusted to 2.5 using a 50% wt solution of NaOH. The ethanol was stripped from the reaction mixture by distillation using a rotary evaporator (Bath temperature 50° C., 120-50 mbar) and deionized water back added to keep the polymer concentration constant (around 35%). The measured solids content was 38.6% (115° C., 60 mins).

ii. Synthesis of the Second Block AA-s-AMPS (DPn 200; Ratio AA/AMPS 75/25 Mol %)

Into a 500 mL double jacketed reactor equipped with mechanical agitator and reflux condenser was added 81.6 g of a 38.6% solution of the 1$^{st}$ block, 9.72 g of Acrylic acid, 20.63 g of a 50% solution of 2-Acrylamido-2-methylpropane sulfonic acid (AMPS), and 173.3 g of De-ionised water. The reactor contents were heated to 75° C. under agitation whereupon 10.2 g of a solution of 10 wt % sodium persulphate (NaPS) was added in 1 shot. Immediately thereafter, a feed of 55.1 g of acrylic acid was added to the reactor over 2 h by means of a syringe pump. At the same time 116.9 g of a 50% solution of AMPS added over 2 h by means of a syringe pump. Once the monomer feeds had ended further 10.2 g of a 10% solution of NaPS were added to the reactor and the reaction mixture was aged at 75° C. for a further 4 hours whereupon it was cooled to ambient temperature and discharged. The measured solids content was 38.9% (115° C., 60 mins).

552 g of polymer solution was placed in a 1 L 2 necked round bottomed flask equipped with a magnetic stirrer bar. The pH of the solution was increased to 8.5 using a 50% solution of NaOH. The mixture was heated to 70° C. with stirring whereupon 2.65 g of a 30% solution of hydrogen peroxide was added in 1 shot. After 15 minutes, a further 2.65 g shot of hydrogen peroxide (30%) was added. The addition was repeated at 30 minutes and at 45 minutes. At the end of the additions, the solution was aged for a further 3 h 45 whereupon it was cooled and discharged. Dexanthation was confirmed using GPC analysis equipped with RI and UV (290 nm) detection.

The weight average molar mass was 57250 g/mol and number average molar mass as measured by the GPC technique described above was 25450 g/mol. The residual acrylic acid as measured by HPLC was <10 ppm and the residual AMPS monomer was <20 ppm. The solids content was 42.2% (100° C., 60 minutes).

Example 4 (Outside the Invention)

Synthesis of the Copolymer PAA-b-(AA-Stat-AMPS) (DPn 200-28); Ratio AA/AMPS 75/25 Mol %)

i. Synthesis of the First Block PAA (DPn 200)

Into a 500 mL double jacketed reactor equipped with mechanical agitator and reflux condenser was added 2.3 g of O-ethyl-S-(1-methoxycarbonylethyl)xanthate (CH$_3$CH (CO$_2$CH$_3$))S(C=S)OEt), 11.67 g of Ethanol, and 11.67 g of De-ionised water. The reactor contents were heated to 70° C. under agitation whereupon 7.5 g of a solution of 5 wt % V-50 (2,2'-Azobis(2-methylpropionamidine) dihydrochloride) was added in 1 shot. Immediately thereafter, a feed of 389.2 g of a solution of 69.8 wt % acrylic acid was added to the reactor over 3 h by means of a syringe pump. At the same time 50.0 g of a solution of 3.7 wt % V50 was added over 3 h 10 minutes by means of a syringe pump. Once the initiator feed had ended, the reaction mixture was aged at 70° C. for a further hour whereupon it was cooled to ambient temperature and discharged. The pH of the reaction mixture was then adjusted to 2.5 using a 50% wt solution of NaOH. The ethanol was stripped from the reaction mixture by distillation using a rotary evaporator (Bath temperature 50° C., 120-50 mbar) and deionized water back added to keep the polymer concentration constant (around 35%). The measured solids content was 37.6% (115° C., 60 mins).

ii. Synthesis of the Second Block AA-s-AMPS (DPn 28; Ratio 75/25 Mol %)

Into a 500 mL double jacketed reactor equipped with mechanical agitator and reflux condenser was added 290.4 g of a 37.6% solution of the $1^{st}$ block, 1.3 g of Acrylic acid, 2.75 g of a 50% solution of 2-Acrylamido-2-methylpropane sulfonic acid (AMPS), and 36.0 g of De-ionised water. The reactor contents were heated to 75° C. under agitation whereupon 6.6 g of a solution of 10 wt % sodium persulphate (NaPS) was added in 1 shot. Immediately thereafter, a feed of 7.3 g of acrylic acid was added to the reactor over 2 h by means of a syringe pump. At the same time 15.6 g of a 50% solution of AMPS added over 2 h by means of a syringe pump. Once the monomer feeds had ended further 6.6 g of a 10% solution of NaPS were added to the reactor and the reaction mixture was aged at 75° C. for a further 4 hours whereupon it was cooled to ambient temperature and discharged. The measured solids content was 36% (115° C., 60 mins).

366 g of polymer solution was placed in a 1 L 2 necked round bottomed flask equipped with a magnetic stirrer bar. The pH of the solution was increased to 8.5 using a 50% solution of NaOH. The mixture was heated to 70° C. with stirring whereupon 2.02 g of a 30% solution of hydrogen peroxide was added in 1 shot. After 15 minutes, a further 2.02 g shot of hydrogen peroxide (30%) was added. The addition was repeated at 30 minutes and at 45 minutes. At the end of the additions, the solution was aged for a further 3 h 45 whereupon it was cooled and discharged. Dexanthation was confirmed using GPC analysis equipped with RI and UV (290 nm) detection.

The weight average molar mass was 26410 g/mol and number average molar mass as measured by the GPC technique described above was 17770 g/mol. The residual acrylic acid as measured by HPLC was <10 ppm and the residual AMPS monomer was <20 ppm. The solids content was 42.2% (100° C., 60 minutes).

Example 5

Synthesis of the Copolymer PAA-b-(AA-Stat-SVS) DPn 60-60); Ratio AA/SVS 75/25 Mol %)

i. Synthesis of the First Block PAA (DPn 60)

Into a 1 L double jacketed reactor equipped with mechanical agitator and reflux condenser was added 7.7 g of O-ethyl-S-(1-methoxycarbonylethyl)xanthate ($CH_3CH(CO_2CH_3)$)S(C=S)OEt), 24.1 g of Acrylic acid, 55.4 g of Ethanol, and 221.5 g of De-ionised water. The reactor contents were heated to 70° C. under agitation whereupon 12.6 g of a solution of 10 wt % V-50 (2,2'-Azobis(2-methylpropionamidine) dihydrochloride) was added in 1 shot. Immediately thereafter, a feed of 136.6 g of acrylic acid was added to the reactor over 3 h by means of a syringe pump. At the same time 37.8 g of a solution of 10% wt V50 was added over 3 h 10 minutes by means of a syringe pump. Once the initiator feed had ended, the reaction mixture was aged at 70° C. for a further hour whereupon it was cooled to ambient temperature and discharged. The pH of the reaction mixture was then adjusted to 2.5 pH using a 50% wt solution of NaOH. The ethanol was stripped from the reaction mixture by distillation using a rotary evaporator (Bath temperature 50° C., 120-50 mbar) and deionized water back added to keep the polymer concentration constant (around 35%). The measured solids content was 37.2% (115° C., 60 mins).

ii. Synthesis of the Second Block AA-s-SVS (DPn 60; Ratio AA/SVS 75/25 Mol %)

Into a 500 mL double jacketed reactor equipped with mechanical agitator and reflux condenser was added 206.7 g of a 37.2% solution of the $1^{st}$ block, 5.7 g of Acrylic acid, 13.7 g of a 25% solution of Vinylsulfonic Acid Sodium Salt (SVS), and 57.6 g of De-ionised water. The reactor contents were heated to 70° C. under agitation whereupon 6.17 g of a solution of 10 wt % V50 (2,2'-Azobis(2-methylpropionamidine) dihydrochloride) was added in 1 shot. Immediately thereafter, a feed of 51.1 g of acrylic acid was added to the reactor over 6 h by means of a syringe pump. At the same time 122.9 g of a 25% solution of SVS was added over 6 h by means of a syringe pump and 24.7 g of a solution of 10 wt % V50 (2,2'-Azobis(2-methylpropionamidine) dihydrochloride) was added over 6 h 30 by means of a syringe pump. Once the monomer feeds had ended the reaction mixture was aged at 70° C. for a further 2 hours whereupon it was cooled to ambient temperature and discharged. The measured solids content was 38.9% (115° C., 60 mins).

450 g of polymer solution was placed in a 1 L 2 necked round bottomed flask equipped with a magnetic stirrer bar. The pH of the solution was increased to 8.5 using a 50% solution of NaOH. The mixture was heated to 70° C. with stirring whereupon 6.3 g of a 30% solution of hydrogen peroxide was added in 1 shot. After 15 minutes, a further 6.3 g shot of hydrogen peroxide (30%) was added. The addition was repeated at 30 minutes and at 45 minutes. At the end of the additions, the solution was aged for a further 3 h 45 whereupon it was cooled and discharged. Dexanthation was confirmed using GPC analysis equipped with RI and UV (290 nm) detection.

The weight average molar mass was 11420 g/mol and number average molar mass as measured by the GPC technique described above was 7599 g/mol. The residual acrylic acid as measured by HPLC was 232. The solids content was 36.1% (100° C., 60 minutes).

Example 6 (Outside the Invention)

Synthesis of the Copolymer PAA-Stat-AMPS (DPn 60; Ratio AA/AMPS 75/25 Mol %)

Into a 500 ml double jacketed reactor equipped with mechanical agitator and reflux condenser was added 2.8 g of O-ethyl-S-(1-methoxycarbonylethyl)xanthate ($CH_3CH(CO_2CH_3)$)S(C=S)OEt), 12.6 g of Ethanol, and 12.6 g of De-ionised water. The reactor contents were heated to 70° C. under agitation whereupon 5.95 g of a solution of 10 wt % V-50 (2,2'-Azobis(2-methylpropionamidine) dihydrochloride) was added in 1 shot. Immediately thereafter, a feed of a mixture of 46 g of acrylic acid and 97.5 g of 50 wt % 2-Acrylamido-2-methylpropane sulfonic acid (AMPS) and 105.6 g of De-ionised water was added to the reactor over 3 h by means of a syringe pump. At the same time 17.9 g of a solution of 10% wt V50 diluted in 32.1 g of De-ionised water was added over 3 h 10 minutes by means of a syringe pump. Once the initiator feed had ended, the reaction mixture was aged at 70° C. for a further hour whereupon it was cooled to ambient temperature and discharged. The pH of the reaction mixture was then adjusted to 2.5 pH using a 50% wt solution of NaOH. The ethanol was stripped from the reaction mixture by distillation using a rotary evaporator (Bath temperature 50° C., 120-50 mbar) and deionized water back added to keep the polymer concentration constant (around 30%). The measured solids content was 32.2% (115° C., 60 mins).

100 g of polymer solution was placed in a 250 ml 2 necked round bottomed flask equipped with a magnetic stirrer bar. The pH of the solution was increased to 8.5 using a 50% solution of NaOH. The mixture was heated to 70° C. with stirring whereupon 1.3 g of a 30% solution of hydrogen peroxide was added in 1 shot. After 15 minutes, a further 1.3 g shot of hydrogen peroxide (30%) was added. The addition was repeated at 30 minutes and at 45 minutes. At the end of the additions, the solution was aged for a further 3 h 45 whereupon it was cooled and discharged. Dexanthation was confirmed using GPC analysis equipped with RI and UV (290 nm) detection.

The weight average molar mass was 8378 g/mol and number average molar mass as measured by the GPC technique described above was 5389 g/mol. The residual acrylic acid as measured by HPLC was <10 ppm and the residual AMPS monomer was <20 ppm. The solids content was 34.5% (115° C., 60 minutes)

Example 7

Synthesis of the Copolymer PAA-b-(AA-Stat-AMPS) (DPn 60-60; Ratio AA/AMPS 50/50 Mol %)

i. Synthesis of the First Block PAA (DPn 60, $Mn_{th}$ 4533 g/Mol)

Into a 500 mL double jacketed reactor equipped with mechanical agitator and reflux condenser was added 6.3 g of O-ethyl-S-(1-methoxycarbonylethyl)xanthate ($CH_3CH(CO_2CH_3))S(C=S)OEt$), 56.4 g of Ethanol, and 225.7 g of De-ionised water and 19.5 g of acrylic acid. The reactor contents were heated to 70° C. under agitation whereupon 13.2 g of a solution of 10 wt % V-50 (2,2'-Azobis(2-methylpropionamidine) dihydrochloride) was added in 1 shot. Immediately thereafter, a feed of 110.3 g of acrylic acid was added to the reactor over 3 h by means of a syringe pump. At the same time 39.7 g of a solution of 10 wt % V50 was added over 3 h 10 minutes by means of a syringe pump. Once the initiator feed had ended, the reaction mixture was aged at 70° C. for a further hour whereupon it was cooled to ambient temperature and discharged. The pH of the reaction mixture was then adjusted to 2.5 using a 50% wt solution of NaOH. The ethanol was stripped from the reaction mixture by distillation using a rotary evaporator (Bath temperature 50° C., 120-50 mbar) and deionized water back added to keep the polymer concentration constant (around 30%). The measured solids content was 31.3% (115° C., 60 mins).

ii. Synthesis of the Second Block AA-s-AMPS (DPn 60; Ratio AA/AMPS 50/50 Mol %)

Into a 500 mL double jacketed reactor equipped with mechanical agitator and reflux condenser was added 151.6 g of a 31.3% solution of the $1^{st}$ block, 3.24 g of Acrylic acid, 20.6 g of a 50% solution of 2-Acrylamido-2-methylpropane sulfonic acid (AMPS), and 25.3 g of De-ionized water. The reactor contents were heated to 75° C. under agitation whereupon 5.7 g of a solution of 10 wt % sodium persulphate (NaPS) was added in 1 shot. Immediately thereafter, a feed of 18.4 g of acrylic acid was added to the reactor over 2 h by means of a syringe pump. At the same time 116.9 g of a 50% solution of AMPS added over 2 h by means of a syringe pump. Once the monomer feeds had ended further 5.7 g of a 10% solution of NaPS were added to the reactor and the reaction mixture was aged at 75° C. for a further 4 hours whereupon it was cooled to ambient temperature and discharged. The measured solids content was 44.7% (115° C., 60 mins).

150 g of polymer solution was placed in a 500 ml 2 necked round bottomed flask equipped with a magnetic stirrer bar. The pH of the solution was increased to 8.5 using a 50% solution of NaOH. The mixture was heated to 70° C. with stirring whereupon 1.8 g of a 30% solution of hydrogen peroxide was added in 1 shot. After 15 minutes, a further 1.8 g shot of hydrogen peroxide (30%) was added. The addition was repeated at 30 minutes and at 45 minutes. At the end of the additions, the solution was aged for a further 3 h 45 whereupon it was cooled and discharged. Dexanthation was confirmed using GPC analysis equipped with RI and UV (290 nm) detection.

The weight average molar mass was 19430 g/mol and number average molar mass as measured by the GPC technique described above was 13040 g/mol. The residual acrylic acid as measured by HPLC was <10 ppm and the residual AMPS monomer was <20 ppm. The solids content was 38% (115° C., 60 minutes).

Example 8

Synthesis of the Copolymer PAA-b-(AA-Stat-AMPS) (DPn 60-80; Ratio AA/AMPS 50/50 Mol %)

i. Synthesis of the First Block PAA (DPn 60, $Mn_{th}$ 4533 g/Mol)

Into a 500 mL double jacketed reactor equipped with mechanical agitator and reflux condenser was added 6.3 g of O-ethyl-S-(1-methoxycarbonylethyl)xanthate ($CH_3CH(CO_2CH_3))S(C=S)OEt$), 56.4 g of Ethanol, and 225.7 g of De-ionised water and 19.46 g of acrylic acid. The reactor contents were heated to 70° C. under agitation whereupon 13.2 g of a solution of 10 wt % V-50 (2,2'-Azobis(2-methylpropionamidine) dihydrochloride) was added in 1 shot. Immediately thereafter, a feed of 110.3 g of acrylic acid was added to the reactor over 3 h by means of a syringe pump. At the same time 39.7 g of a solution of 10 wt % V50 was added over 3 h 10 minutes by means of a syringe pump. Once the initiator feed had ended, the reaction mixture was aged at 70° C. for a further hour whereupon it was cooled to ambient temperature and discharged. The pH of the reaction mixture was then adjusted to 2.5 using a 50% wt solution of NaOH. The ethanol was stripped from the reaction mixture by distillation using a rotary evaporator (Bath temperature 50° C., 120-50 mbar) and deionized water back added to keep the polymer concentration constant (around 30%). The measured solids content was 31.3% (115° C., 60 mins).

ii. Synthesis of the Second Block AA-s-AMPS (DPn 80; Ratio AA/AMPS 50/50 Mol %)

Into a 500 mL double jacketed reactor equipped with mechanical agitator and reflux condenser was added 113.7 g of a 31.3% solution of the $1^{st}$ block, 3.24 g of Acrylic acid, 20.6 g of a 50% solution of 2-Acrylamido-2-methylpropane sulfonic acid (AMPS), and 80.93 g of De-ionized water. The reactor contents were heated to 75° C. under agitation whereupon 4.3 g of a solution of 10 wt % sodium persulphate (NaPS) was added in 1 shot. Immediately thereafter, a feed of 18.4 g of acrylic acid was added to the reactor over 2 h by means of a syringe pump. At the same time 116.9 g of a 50% solution of AMPS added over 2 h by means of a syringe pump. Once the monomer feeds had ended further 4.3 g of a 10% solution of NaPS were added to the reactor and the reaction mixture was aged at 75° C. for a further 4 hours whereupon it was cooled to ambient temperature and discharged. The measured solids content was 38.2% (115° C., 60 mins).

156.8 g of polymer solution was placed in a 500 ml 2 necked round bottomed flask equipped with a magnetic stirrer bar. The pH of the solution was increased to 8.5 using a 50% solution of NaOH. The mixture was heated to 70° C. with stirring whereupon 1.2 g of a 30% solution of hydrogen peroxide was added in 1 shot. After 15 minutes, a further 1.2 g shot of hydrogen peroxide (30%) was added. The addition was repeated at 30 minutes and at 45 minutes. At the end of the additions, the solution was aged for a further 3 h 45 whereupon it was cooled and discharged. Dexanthation was confirmed using GPC analysis equipped with RI and UV (290 nm) detection.

The weight average molar mass was 28050 g/mol and number average molar mass as measured by the GPC technique described above was 18340 g/mol. The residual acrylic acid as measured by HPLC was <10 ppm and the residual AMPS monomer was <20 ppm. The solids content was 38% (115° C., 60 minutes).

Example 9

Performance of the Copolymer of the Invention in an ADW Composition

Different (co)polymers (see table 1 below) were tested for their anti-filming effect for the washing of two glasses in an automatic dishwasher.

Test of Anti-Filming Effect

Glass should be perfectly clean before testing. The glasses (sold by CHOMETTE FAVOR under the reference Islande 33 cL) are initially cleaned with a high alkaline detergent, which is a blend of 55% of sodium tri-polyphosphate (STPP) and 45% of sodium metasilicate. Then, glasses are cleaned with citric acid to remove the alkalinity.

Each glass should be checked under a light box that it is completely free of spot and film before use.

After this prewashing, the filming of the clean glasses is evaluated at 8, using a 1-10 scale in which 1 is completely covered with heavy chalky film and 10 is clear (Depending on the composition or the thickness, other glasses could be more transparent than these glasses and achieve a filming at 10).

Then, two clean glasses are placed on the upper rack of a Miele G 646 SC Plus Prima automatic dishwasher.

Three ADW cycles are run for an evaluation, with the introduction of 50 g of frozen soil and 20 g of detergent at each cycle at 55° C.

The soil consists in weight percentage of 70% water, 5% milk, 2.5% mustard, 2.5% ketchup, 2.5% gravy, 0.5% potato starch, 0.4% benzoic acid, 10% margarine, 5% egg yolk.

A Normal wash program consists of a 55° C. main wash followed by two heated rinses (65° C.) and a heated dry cycle. Water Hardness was adjusted to 35°TH. This water contains molar ratio of Ca:Mg of 3:1 (as salts used are $CaCl_2 \cdot 2H_2O$ and $MgSO_4 \cdot 7H_2O$) and 400 mg/L $NaHCO_3$.

The different (co)polymers (see table 1 below) are tested in liquid form and added five minutes later than a commercial formulation that is, in the present example, detergent P-free tablet sold under the name Finish Quantum from the United States market.

The concentration of (co)polymer or blend of (co)polymers is 5% by weight of the total blend. 20.0 g of detergent are dosed via the dispenser cup of the automatic dishwasher.

After completion of the three wash programs, the appearance of the washed glassware was assessed visually using a light box, method inspired by ASTM Method D3556 85. The light box is essentially a darkened room with the glasses being placed on racks and illuminated from within to disclose spots or film. All interior surfaces of the light box are black, so that the only light present is that which passes up through the tumblers.

Washed glasses were scored (see Table 1 below, column "Filming") using the 1-10 scale in which 1 is completely covered with heavy chalky film and 10 is clear.

Results

The results are recorded in Table 1 below.

TABLE 1

| Polymers used | Chemistry | Filming |
|---|---|---|
| Control (no additives) | | 3 |
| Acusol 587D from Dow | Statistical AA/AMPS 80/20 Mw = 18700 g/mol 5% active/tab | 3-4 |
| Homopolymer (example 1) | pAA DPn = 60 5% active/tab | 3 |
| Statistical copolymer (example 6) | pAA/AMPS 75/25 DPn = 60 5% active/tab | 3-4 |
| Diblock copolymer (according to the invention) (example 2) | pAA-b-(pAA/AMPS 75/25) DPn = 60 – 60 5% active/tab | 4-5 |
| Blend of Homopolymer (example 1) and statistical copolymer (example 6) | pAA DPn = 60 2.1% act/tab and pAA/AMPS 75/25 DPn = 60 2.9% act/tab | 3-4 |

This example clearly demonstrates the ability of the copolymer of the invention (i.e. PAA-b-P(AA-s-AMPS 75/25)) to deliver glass appearance benefits superior to those of the current statistical copolymers or homopolymers or a blend of them. The copolymer of the invention clearly provides an anti-filming effect superior to any that may be provided by the current antiscalant polymers.

Example 10

The anti-filming performance of a diblock copolymer of the invention is compared to the performances of other diblock copolymers that do not comply with the specificities of the invention.

The protocol for testing anti-filming effect is the same as described in previous example 9 (see Table 2 below, column "Filming"). Commercial formulations used for this example are the P-free tab Finish Quantum from the United States market.

The results are recorded in Table 2 below.

TABLE 2

| Polymers used | Chemistry | Filming |
|---|---|---|
| Control (no additives) | — | 3 |
| Diblock copolymer (outside the invention) (example 4) | pAA-b-(pAA/AMPS 75/25) DPn = 200 – 28 5% active/tab | 3 |
| Diblock copolymer (according to the invention) (example 2) | pAA-b-(pAA/AMPS 75/25) DPn = 60 – 60 5% active/tab | 4-5 |
| Diblock copolymer (according to the invention) (example 3) | pAA-b-(pAA/AMPS 75/25) DPn = 60 – 200 5% active/tab | 5 |

This example clearly demonstrates the effect of degree of polymerization for each block on the performances on the filming. A too high DPn (200) for acrylic acid block has an adverse impact on the filming. On the contrary, a high DPn for the block AA-s-AMPS improves the anti-filming effect.

Example 11

The anti-filming performance of a diblock copolymer of the invention is compared to the performances of (co) polymers that do not comply with the specificities of the invention.

The protocol for testing anti-filming effect is the same as described in previous example 9 (see Table 3 below, column "Filming"). Commercial formulations used for this example are the P-free tabs Univert.

The results are recorded in Table 3 below.

TABLE 3

| Polymers used | Chemistry | Filming |
|---|---|---|
| Control (no additives) | — | 5 |
| Acusol 587D from Dow | Statistical AA/AMPS 80/20 Mw = 18700 g/mol 5% active/tab | 5 |
| Diblock copolymer (according to the invention) (example 2) | pAA-b-(pAA/AMPS 75/25) DPn = 60 – 60 5% active/tab | 6 |
| Diblock copolymer (according to the invention) (example 7) | pAA-b-(pAA/AMPS 50/50) DPn = 60 – 60 5% active/tab | 6 |

Example 12

The protocol for testing anti-filming effect is the same as described in previous example 9 (see Table 4 below, column "Filming"). Commercial formulations used for this example are the P-free tabs Univert.

The results are recorded in Table 4 below.

TABLE 4

| Polymers used | Chemistry | Filming |
|---|---|---|
| Control (no additives) | — | 5 |
| Acusol 587D from Dow | Statistical AA/AMPS 80/20 Mw = 18700 g/mol 5% active/tab | 5 |
| Diblock copolymer (according to the invention) (example 2) | pAA-b-(pAA/AMPS 75/25) DPn = 60 – 60 5% active/tab | 6 |

TABLE 4-continued

| Polymers used | Chemistry | Filming |
|---|---|---|
| Diblock copolymer (according to the invention) (example 5) | pAA-b-(pAA/SVS 75/25) DPn = 60 – 60 5% active/tab | 7 |

Example 13

The protocol for testing anti-filming effect is the same as described in previous example 9 (see Table 5 below, column "Filming"). Commercial formulation used for this example is the SUN turbo gel all-in-one.

The results are recorded in Table 5 below.

TABLE 5

| Polymers used | Chemistry | Filming |
|---|---|---|
| Control (no additives) | — | 2-3 |
| Acusol 587D from Dow | Statistical AA/AMPS 80/20 Mw = 18700 g/mol 5% active/detergent | 5 |
| Diblock copolymer (according to the invention) (example 2) | pAA-b-(pAA/AMPS 75/25) DPn = 60 – 60 5% active/tab | 6 |
| Blend of homopolymer (example 1) and statistical copolymer (example 6) | pAA DPn = 60 2.1% act/detergent and pAA/AMPS 75/25, DPn = 60 2.9% act/detergent | 5 |

This example clearly demonstrates the ability of the copolymer of the invention (i.e. PAA-b-P(AA-s-AMPS 75/25)) to deliver glass appearance benefits superior to those provided by commercially available statistical copolymers or by the blend of the homopolymer and statistical copolymer in a P-free gel formulation.

This example also illustrates that the copolymers of the invention can be used in different forms of detergent.

Example 14

The diblock polymer of the invention is tested in combination with the Mirapol SURF-S-480PF on the anti-filming and anti-spotting effects.

Mirapol SURF S 480PF is known as a rinse-aid copolymer which avoids the formation of droplets after the rinsing and, thus, resulting in a clear glass with no spotting.

In this example, the spotting and the filming are both evaluated after 3 washing cycles.

Washed glasses were scored using a 1-10 scale in which 1 is completely covered with spots or heavy chalky film and 10 is clear. Commercial formulation used for this example is the SUN Turbo gel all-in-one.

Results are recorded in Table 6 below.

TABLE 6

| Polymers used | Chemistry | Filming | Spotting |
|---|---|---|---|
| Control (no additives) | — | 2-3 | 1 |
| Acusol 587D from Dow | Statistical AA/AMPS 80/20 Mw = 18700 g/mol 5% active/detergent | 5 | 1 |

TABLE 6-continued

| Polymers used | Chemistry | Filming | Spotting |
|---|---|---|---|
| Mirapol Surf S 480 PF | amphoteric copolymer 0.4% active/detergent | 2 | 7 |
| Diblock copolymer (according to the invention) (example 2) | pAA-b-(pAA/AMPS 75/25) $DP_n = 60 - 60$ 5% active/detergent | 6 | 1 |
| Blend of Mirapol SURF S 480 PF and Diblock copolymer of the invention | 0.4% actives of Mirapol + 5% actives of diblock (pAA-b-(pAA/AMPS 75/25) $DP_n = 60 - 60$) | 5 | 5 |

This example clearly demonstrates the effect of the blend of rinse-aid copolymer such as Mirapol 480PF and a copolymer according to the invention; the blend improves the shine of glass, less filming and less spotting are observed compared to the commercial gel formulation.

Example 15

Performance of the Copolymer of the Invention in an ADW Composition

Different polymers (see Table 7 below) were tested on two different types of glasses for their anti-filming effect for the washing of glasses in a automatic dishwasher after 30 cycles.

Test of Anti-Filming Effect

Glass should be perfectly clean before testing and are initially cleaned with a high alkaline detergent. Then, glasses are cleaned with citric acid to remove the alkalinity.

Each glass should be checked under a black box that it is completely free of spot and film before use.

After this prewashing, the filming of the clean glasses is evaluated at 10, using a 1-10 scale in which 1 is completely covered with heavy chalky film and 10 is clear.

Then, the clean glasses are placed on a Miele G 1355 SC automatic dishwasher.

30 ADW cycles in automatic machines are run for an evaluation, with the introduction of 50 g of soil and 20 g of detergent at each cycle at 50° C., program Turbo.

The soil consists in weight percentage of 70% water, 5% milk, 2.5% mustard, 2.5% ketchup, 2.5% gravy, 0.5% potato starch, 0.4% benzoic acid, 10% margarine, 5% egg yolk.

Water Hardness was adjusted to 35°TH (21° dH). This water contains molar ratio of Ca:Mg of 3:1 (as salts used are $CaCl_2*2H_2O$ and $MgSO_4*7H_2O$) and 400 mg/L $NaHCO_3$.

The different (co)polymers (see Table 7 below) are tested in liquid form and added on a P-free lab formula from Henkel which does not contain any polymer.

The concentration of (co)polymer or blend of (co)polymers is 5% by weight of the total blend. 20.0 g of detergent are dosed via the dispenser cup of the automatic dishwasher.

After completion of the thirty wash programs, the appearance of the washed glassware was assessed visually using a light box, method inspired by ASTM Method D3556 85. The light box is essentially a darkened room with the glasses being placed on racks and illuminated from within to disclose spots or film. All interior surfaces of the light box are black, so that the only light present is that which passes up through the tumblers.

Washed glasses were scored using the 1-10 scale in which 1 is completely covered with heavy chalky film and 10 is clear.

Results

The results are recorded in Table 7 below.

TABLE 7

| | | Filming | |
|---|---|---|---|
| Polymers used | Chemistry | Glass 1 | Glass 2 |
| None (control) | — | 2.0 | 2.0 |
| Benchmark polymer | Polyacrylate type >8% active/tab | 5.0 | 5.0 |
| Diblock copolymer (according to the invention) (example 8) | pAA-b-(pAA/AMPS 50/50) $DP_n = 60 - 80$ 5% active/tab | 6.0 | 6.0 |

This example clearly demonstrates the ability of the copolymer of the invention (i.e. PAA-b-P(AA-s-AMPS 50/50)) to deliver glass appearance benefits with a low dosage compared to benchmark polymer available in the market.

The invention claimed is:

1. A diblock copolymer comprising units of type A deriving from carboxylic acid monomers and units of type B deriving from sulfonic acid monomers, said units of type A and B representing more than 80 mol % of the total moles of units in the copolymer,
wherein the diblock copolymer further comprises at least:
 one first block, wherein the first block consists of units of type A, and optionally one or more reversible chain transfer agents and optionally one or more initiator fragments, and having a degree of polymerization $DP_1$ comprised between 5 and 150; and
 one second block formed of at least 95 mol % of units of type A and B with a molar ratio of units of type A to units of type B being greater or equal to 1, wherein said units of type A and units of type B are statistically distributed, said second block having a degree of polymerization $DP_2$ such that $DP_2/DP_1 > 1$,
wherein the units of type A derive from monomers selected from the group consisting of acrylic acid, methacrylic acid, ethacrylic acid, alpha-chloro-acrylic acid, bromo acrylic acid, bromomethyl acrylic acid, alpha-cyano acrylic acid, beta methyl-acrylic acid, alpha-phenyl acrylic acid, beta-acryloxy propionic acid, beta-carboxyethyl acrylic acid, sorbic acid, alpha-chloro sorbic acid, angelic acid, cinnamic acid, p-chloro cinnamic acid, beta-styryl acrylic acid, itaconic acid, maleic acid, citraconic acid, mesaconic acid, glutaconic acid, aconitic acid, fumaric acid, vinyl benzoic acid, pentenic acid, propyl acrylic acid, acetamido acrylic acid, maleimido propyl carboxylic acid, and mixtures thereof, and
wherein the units of type B derive from monomers selected from the group consisting of acrylamido-2-methylpropanesulfonic acid, 2-methacrylamido-2-methylpropanesulfonic acid, 3-methyacrylamido-2-hydroxypropanesulfonic acid, (meth)allylsulfonic acid, 1-allyloxy-2-hydroxypropane sulfonic acid, allyloxybenzene sulfonic acid, (meth)allyloxybenzensulfonic acid, 2-hydroxy-3-(2-propenyloxy)propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethylacrylamid, sulfomethylmethacrylamid, water soluble salts thereof, and mixtures thereof.

2. The copolymer according to claim 1, wherein the ratio $DP_2/DP_1$ is less than or equal to 1,000.

3. The copolymer according to claim 1, wherein the first block has a degree of polymerization $DP_1$ greater than or equal to 10 and up to 150.

4. The copolymer according to claim 1, wherein the second block has a degree of polymerization $DP_2$ less than or equal to 2,000.

5. The copolymer according to claim 1, wherein the molar ratio of units of type A to units of type B in the second block ranges from 50/50 to 90/10.

6. A diblock copolymer pAA-b-(pAA/AMPS 75/25) comprising units of type A deriving from acrylic acid monomers and units of type B deriving from acrylic acid and 2-acrylamido-2-methylpropane sulfonate monomers with a molar ratio of type A units to type B units of 75/25.

7. The copolymer according to claim 1, wherein said units of type A of the first block are identical to said units of type A of the second block.

8. The copolymer according to claim 1, wherein the units of type A of the first block, the second block, or both derive from acrylic acid monomer.

9. The copolymer according to claim 1, wherein the units of type B derive from 2-acrylamido-2-methylpropanesulfonate monomer or sodium vinyl sulfonate monomer.

10. The copolymer according to claim 1, wherein said units of type A derive from acrylic acid monomer and said units of type B derive from 2-acrylamido-2-methylpropanesulfonate monomer.

11. The copolymer according to claim 1, wherein the copolymer is a diblock copolymer consisting of one first block and one second block.

12. The copolymer according to claim 11, wherein said diblock copolymer consists of:
   one first block deriving from acrylic acid monomers with a degree of polymerization $DP_1$ comprised between 50 and 65; and
   one second block that is a statistical block deriving from acrylic acid (AA) and 2-acrylamido-2-methylpropanesulfonate (AMPS) monomers with a molar ratio of AA units to AMPS units comprised between 50/50 and 80/20, said second block having a degree of polymerization $DP_2$ comprised between 50 and 250.

13. A detergent composition comprising at least one copolymer according to claim 1.

14. The detergent composition according to claim 13, said detergent composition comprising from 0.001 to 10% by weight of said copolymer with respect to the total weight of the detergent composition.

15. A method of making a dishwashing detergent composition comprising adding at least one copolymer according to claim 1 to the dishwashing detergent composition.

16. The copolymer of claim 10, wherein the copolymer is a diblock copolymer consisting of one first block and one second block.

17. A method of making the copolymer according to claim 1 comprising
   Adding a control agent in a controlled polymerization, wherein the control agent is a reversible chain transfer agent.

18. A method of making the copolymer according to claim 1 comprising
   Polymerizing the first block in the presence of one or more reversible chain transfer agents, and then a second polymerizing the second block in the presence of one or more second reversible chain transfer agents, wherein the reversible chain transfer agents and second reversible chain transfer agents may be the same or different.

19. A method of making the copolymer according to claim 1 comprising
   Reacting type A monomer precursors in presence of one or more reversible chain transfer agents to make the first block, and
   Bringing the first block in presence of Type B monomer precursors and polymerizing the second block, and obtaining the copolymer.

\* \* \* \* \*